US00RE45476E

(19) United States
(12) Reissued Patent
Burrows et al.

(10) Patent Number: US RE45,476 E
(45) Date of Reissued Patent: Apr. 21, 2015

(54) COFFEE BREWER

(71) Applicant: Bruce D. Burrows, Valencia, CA (US)

(72) Inventors: Bruce D. Burrows, Valencia, CA (US); Louis M. Busick, Westerville, OH (US)

(73) Assignee: Remington Designs, LLC, Valencia, CA (US)

(21) Appl. No.: 14/181,448

(22) Filed: Feb. 14, 2014

Related U.S. Patent Documents

Reissue of:
(64) Patent No.: 7,240,611
Issued: Jul. 10, 2007
Appl. No.: 11/247,564
Filed: Oct. 10, 2005

U.S. Applications:
(63) Continuation of application No. 10/845,742, filed on May 14, 2004, now Pat. No. 6,968,775.

(60) Provisional application No. 60/471,926, filed on May 19, 2003.

(51) Int. Cl.
*A47J 31/00* (2006.01)
*A47J 31/057* (2006.01)
*A47J 31/46* (2006.01)

(52) U.S. Cl.
CPC ..... *A47J 31/057* (2013.01); *A47J 31/465* (2013.01)

(58) Field of Classification Search
CPC .... A47J 31/057; A47J 31/4475; A47J 31/465
USPC ..... 99/303, 287
See application file for complete search history.

(56) References Cited

U.S. PATENT DOCUMENTS

| | | | | |
|---|---|---|---|---|
| 670,004 | A | 3/1901 | Normile | |
| 808,730 | A | 1/1906 | Grody | |
| 1,602,632 | A | 10/1926 | Zorn | |
| 1,706,190 | A * | 3/1929 | Shroyer | 99/285 |
| 2,552,169 | A * | 5/1951 | Graham | 99/282 |
| 2,858,762 | A | 11/1958 | Wade | |
| 3,368,476 | A | 2/1968 | Mancioli | |
| 3,638,555 | A | 2/1972 | Mancioli | |
| 3,670,641 | A | 6/1972 | Mancioli | |
| 3,967,546 | A | 7/1976 | Cailliot | |

(Continued)

FOREIGN PATENT DOCUMENTS

DE 43 15 213 A1 11/1994

*Primary Examiner* — Krisanne Jastrzab
(74) *Attorney, Agent, or Firm* — Lowry Blixseth LLP; Scott M. Lowry

(57) ABSTRACT

An improved coffee brewer and brewing method are provided for producing brewed coffee with improved flavor. The coffee brewer includes a brew basket having jet ports connected to a source of heated water and positioned to deliver hot water streams into the brew basket at a location beneath the level of coffee grounds contained therein. These hot water streams turbulently agitate and stir the coffee grounds to produce a substantially fluidized bed of water-borne coffee grounds for improved flavor extraction and enhanced aroma. This fluidized bed is directed against one or more mesh filter elements forming a wall portion of the brew basket for outward passage of the thus-brewed coffee which is then directed into an underlying carafe or the like. In one preferred form, a portion of the brew basket may incorporate a window to permit visual observation of the fluidized bed therein.

19 Claims, 7 Drawing Sheets

(56) References Cited

U.S. PATENT DOCUMENTS

| | | | | |
|---|---|---|---|---|
| 4,070,956 | A | 1/1978 | Brown | 99/304 |
| 4,074,621 | A | 2/1978 | Cailliot | |
| 4,138,936 | A | 2/1979 | Williams | |
| 4,401,014 | A | 8/1983 | McGrail et al. | |
| 4,473,002 | A | 9/1984 | Leuschner et al. | |
| 4,779,520 | A | 10/1988 | Hauslein | |
| 4,962,693 | A | 10/1990 | Miwa et al. | |
| 4,983,412 | A | 1/1991 | Hauslein | |
| 4,995,311 | A | 2/1991 | Naya et al. | |
| 5,047,252 | A | 9/1991 | Liu et al. | |
| 5,265,517 | A | 11/1993 | Gilbert | |
| 5,305,685 | A | 4/1994 | Midden | |
| 5,358,725 | A | 10/1994 | Izumitani et al. | |
| 5,910,205 | A | 6/1999 | Patel | |
| 5,957,035 | A | 9/1999 | Richter | |
| 5,992,299 | A | 11/1999 | Fong | |
| 6,006,655 | A | 12/1999 | Bielfeldt et al. | |
| 6,079,314 | A | 6/2000 | Mackinnon | |
| 6,244,162 | B1 | 6/2001 | Dahmen | |
| 6,279,459 | B1 | 8/2001 | Mork et al. | 99/281 |
| 6,324,964 | B1 | 12/2001 | Niederberger et al. | |
| 6,532,862 | B2 | 3/2003 | Mork et al. | |
| 6,564,697 | B2 | 5/2003 | Maxwell et al. | |
| 6,817,279 | B2 | 11/2004 | Leung et al. | |
| 2001/0052293 | A1 | 12/2001 | Lang | |
| 2003/0157226 | A1 | 8/2003 | Leung et al. | 426/433 |
| 2004/0060451 | A1 | 4/2004 | Leung et al. | |

* cited by examiner

COFFEE BREWER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit of U.S. Provisional Application No. 60/471,926, filed May 19, 2003.

BACKGROUND OF THE INVENTION

This invention relates generally to improvements in devices and systems for brewing coffee or the like. More particularly, this invention relates to an improved coffee brewer utilizing streams of heated water for turbulently agitating and stirring coffee grounds to produce a substantially fluidized bed of water-borne coffee grounds, to yield brewed coffee having improved flavor and enhanced aroma and other characteristics.

Drip-style coffee brewers are available in a wide range of different configurations and sizes for use in residential or commercial environments to produce brewed coffee. Such coffee brewers commonly include a water reservoir from which a controlled volume of water is heated and then dispensed downwardly by dripping or spraying onto coffee grounds contained within an underlying, upwardly open brew basket. The hot water intermixes with the coffee grounds to produce the desired brewed coffee beverage which is drained from the brew basket through a filter element into an underlying coffee pot such as a carafe or decanter. In one common form, the brewer includes a refillable water reservoir from which the water is delivered through a heating element for drip-flow dispensing into the brew basket. Alternately, the brewer may be coupled directly to a tap water supply or the like.

While drip-style coffee brewers of the above described type have been used extensively for many years, the flavor and other characteristics of the brewed coffee is inconsistent and, in many cases, can be of marginal or unacceptable quality. Such problems are believed to stem from inadequate and/or inconsistent intermixing of the hot water with the coffee grounds contained in the brew basket, resulting in brewed coffee exhibiting inconsistent flavor and body traits, often including unacceptable bitter taste attributes. In this regard, the downward dispensing of hot water onto the initially dry coffee grounds in the underlying brew basket can produce erosion-type channels through the coffee grounds, wherein such channels can permit a significant portion of the water volume to pass through the coffee grounds and drip from the brew basket without significantly wetting or otherwise adequately intermixing therewith. While this channeling problem can sometimes be mitigated by carefully pre-distributing the coffee grounds substantially uniformly within the brew basket, significant attention to this aspect of the coffee brewing process is seldom given.

A variety of modified coffee brewers and related brewing processes have been provided in an attempt to overcome these problems and disadvantages by providing improved intermixing between the heated water and the coffee grounds within a filtered brew basket. In general, such concepts utilize mechanical stirring devices for improving thorough contact between the heated water and the coffee grounds. While such concepts may provide brewed coffee with enhanced and/or more consistent flavor characteristics, they inherently incorporate moving parts that increase the overall complexity and cost of the coffee brewer, and are susceptible to occasional break-down to require periodic repair or replacement.

There exists, therefore, a continuing need for further improvements in and to coffee brewers and related coffee brewing processes for achieving significantly improved intermixing between heated water and coffee grounds, for providing brewed coffee of consistent high quality and improved flavor and other desirable attributes, without requiring mechanical stirring devices and their attendant disadvantages. The present invention fulfills these needs and provides further related advantages.

SUMMARY OF THE INVENTION

In accordance with the invention, an improved coffee brewer and brewing method are provided for producing brewed coffee with improved flavor. The coffee brewer includes a removably mounted brew basket having jet ports connected to a source of heated water and positioned to deliver hot water streams into the brew basket at a location for turbulently agitating and stirring coffee grounds contained therein to produce a substantially fluidized bed of water-borne coffee grounds for improved flavor extraction. This fluidized bed is directed against one or more mesh filter elements forming a wall portion of the brew basket for outward passage of the thus-produced coffee which is then directed into an underlying carafe or the like.

In one preferred form, the coffee brewer includes a water reservoir coupled via a first check valve for flow in heat transfer relation with a heating unit. The heating unit elevates the temperature of the water substantially to the boiling point, whereupon the heated water flows through a second check valve to the brew basket. The heated water flows to and through the jet ports into the interior of the brew basket, with at least some of the jet ports being disposed at a position beneath the level of coffee grounds contained therein. As a result, the heated water is jetted or sprayed into and thoroughly wets the coffee grounds with an agitating and stirring action that is effective to lift, suspend, and turbulently stir the grounds in a manner to produce a substantially fluidized bed of water-borne grounds. In the preferred form, the jet ports are oriented for rotationally stirring the coffee grounds with a substantial spinning or orbital path of motion.

The fluidized bed of water-borne coffee grounds provides improved and consistent intermixing of the heated water with the coffee grounds for enhanced flavor extraction with minimal bitter and/or other undesirable attributes. This spinning fluidized bed is directed by centrifugal action in a generally radially outward direction against an inboard side wall of the brew basket, a portion of which is defined by the mesh filter element or elements which permit outward flow-through passage of the brewed liquid coffee while substantially preventing outward passage of the coffee grounds. The brewed coffee passed through the filter element or elements is directed further as by gravity flow into an underlying coffee pot such as a carafe or decanter.

In accordance with a further preferred aspect of the invention, a frontal portion of the brew basket side wall comprises a substantially transparent window visible from the exterior of the coffee brewer, when the brew basket mounted is thereon. During a brewing cycle, the spinning fluidized bed of water-borne coffee grounds within the brew basket is thus externally observable.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
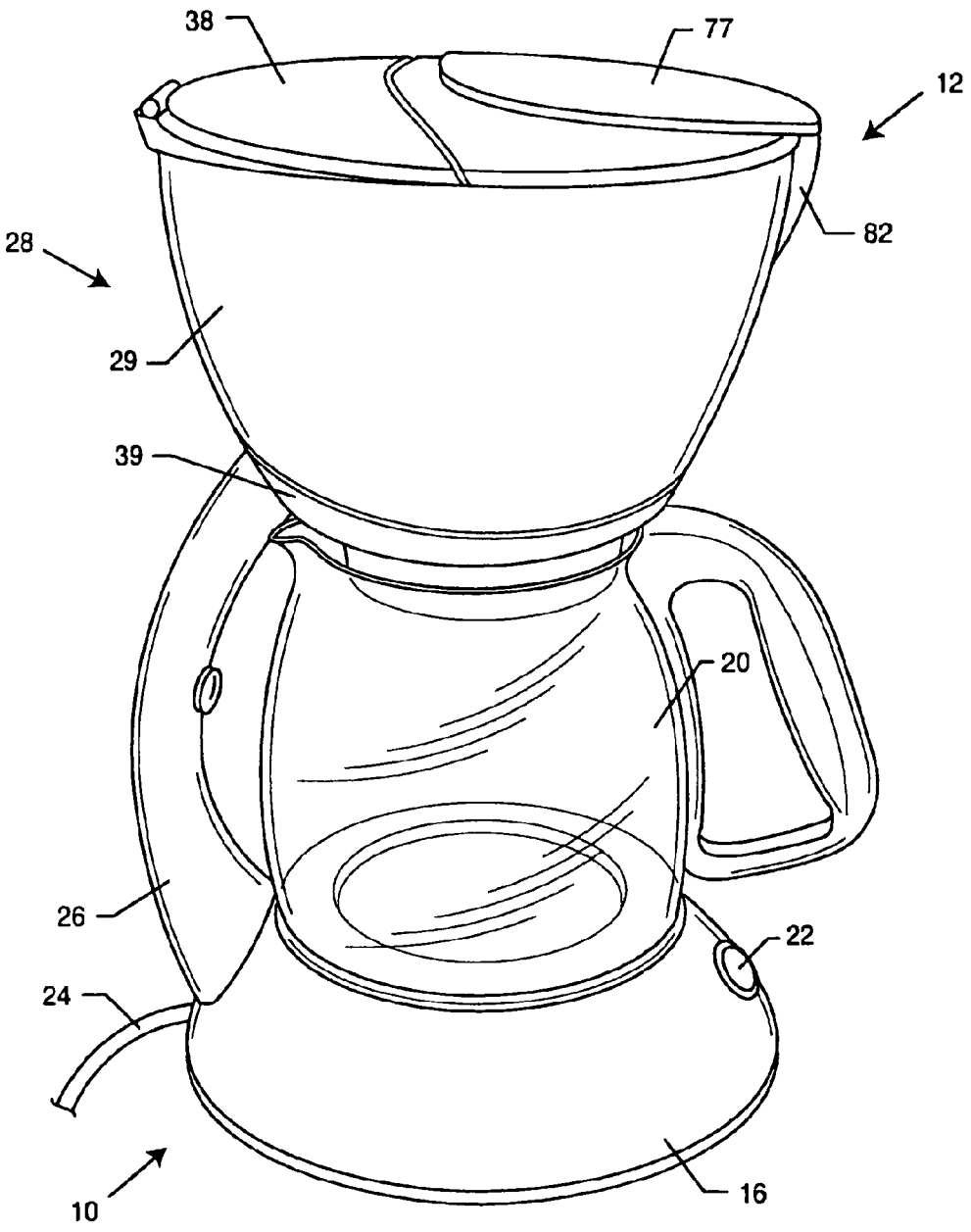
FIG. 1 is a side perspective view illustrating a coffee brewer in accordance with the present invention, with a carafe positioned beneath an overlying head of the coffee brewer for drip-flow reception of brewed coffee.
Figure 2:
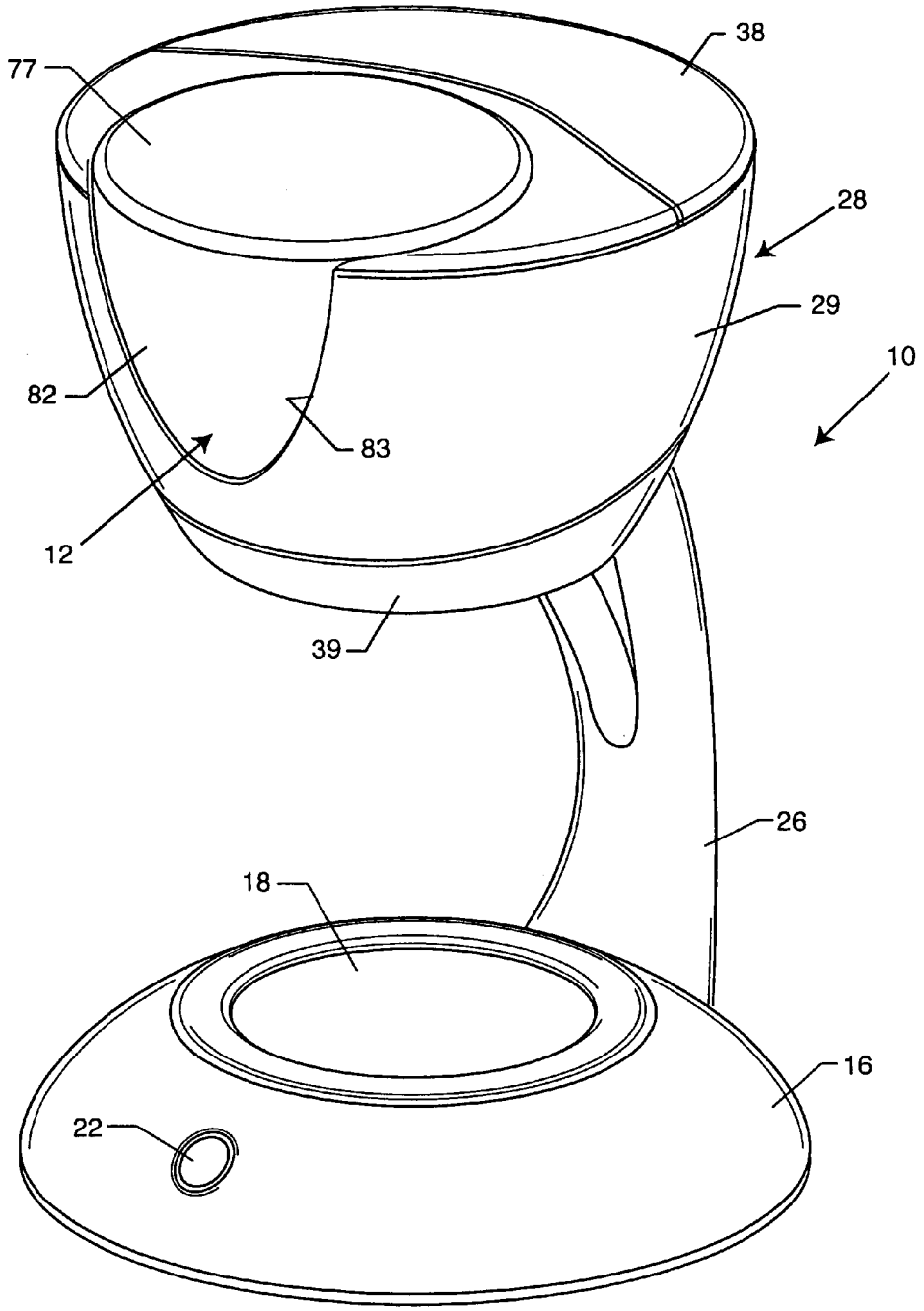
FIG. 2 is a front perspective view of the coffee brewer of FIG. 1, with the carafe removed.
Figure 3:
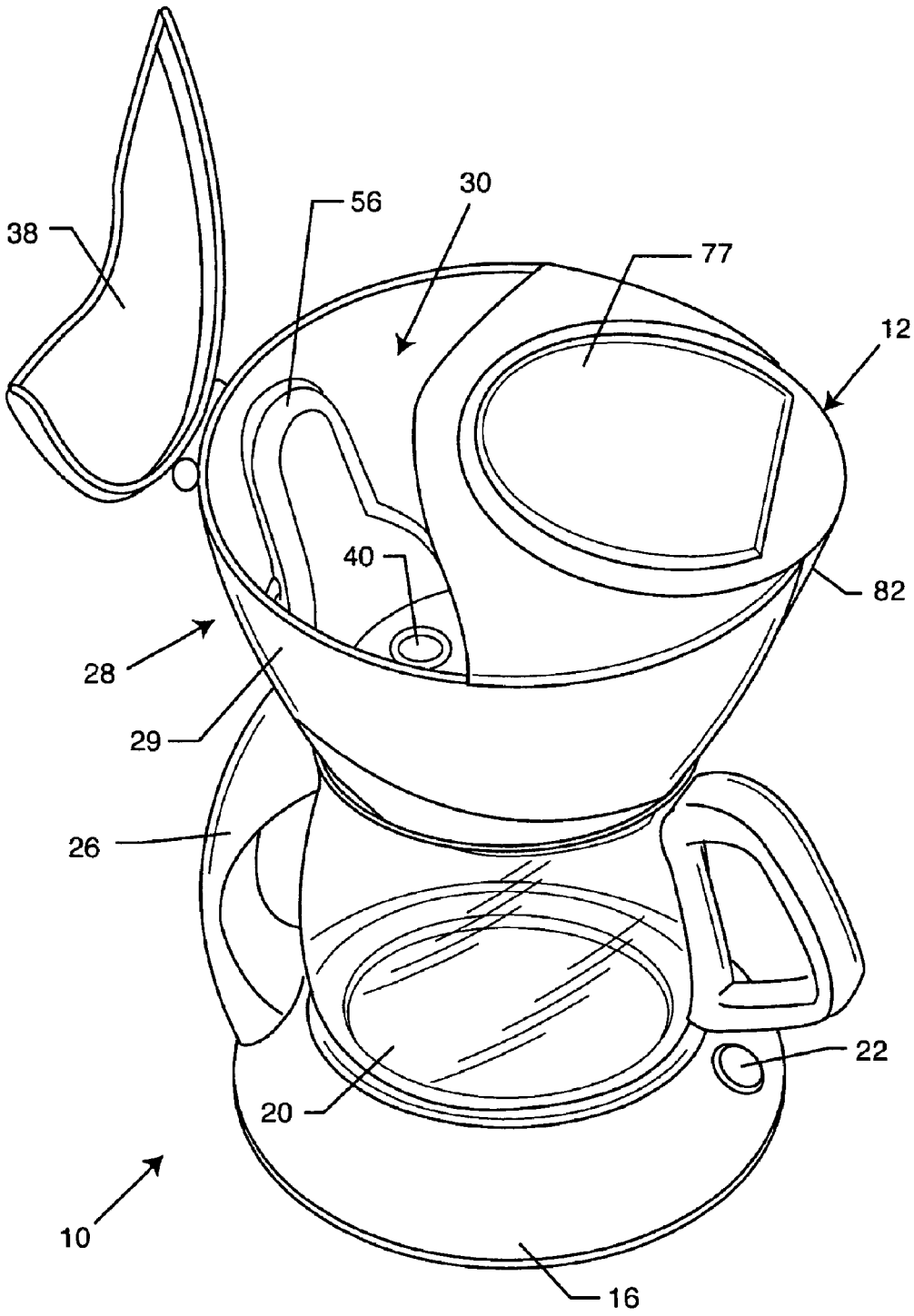
FIG. 3 is a top perspective view of the coffee brewer, with a hinged lid on the brewer head disposed in an open position to expose an underlying reservoir for pour-in reception of a volume of water for use in brewing coffee.
Figure 4:
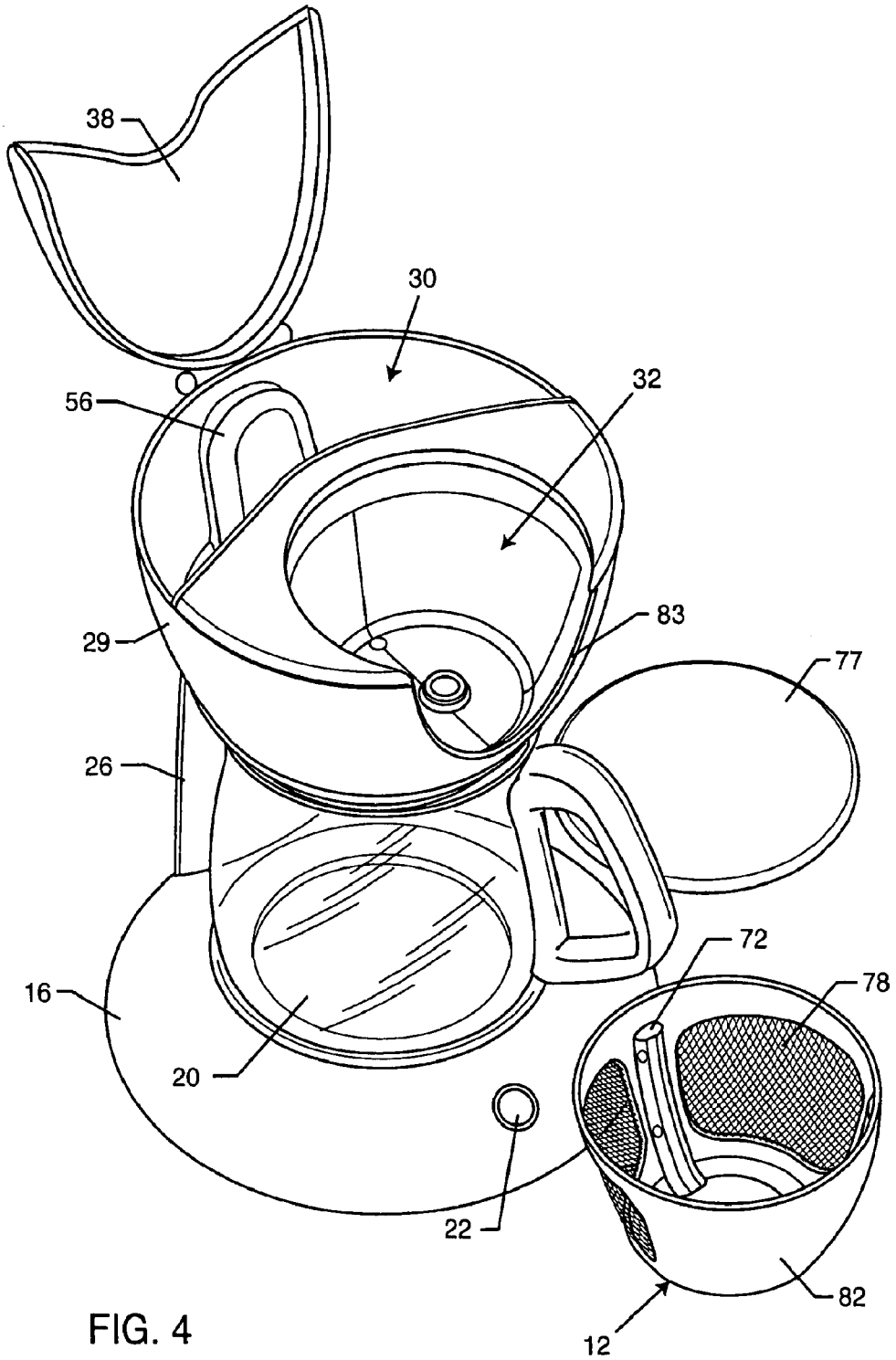
FIG. 4 is another top perspective view similar to FIG. 3, but depicting additional removal of a brew basket and cap therefor, to expose an upwardly open cavity on the brewer head for removably supporting the brew basket.
Figure 5:
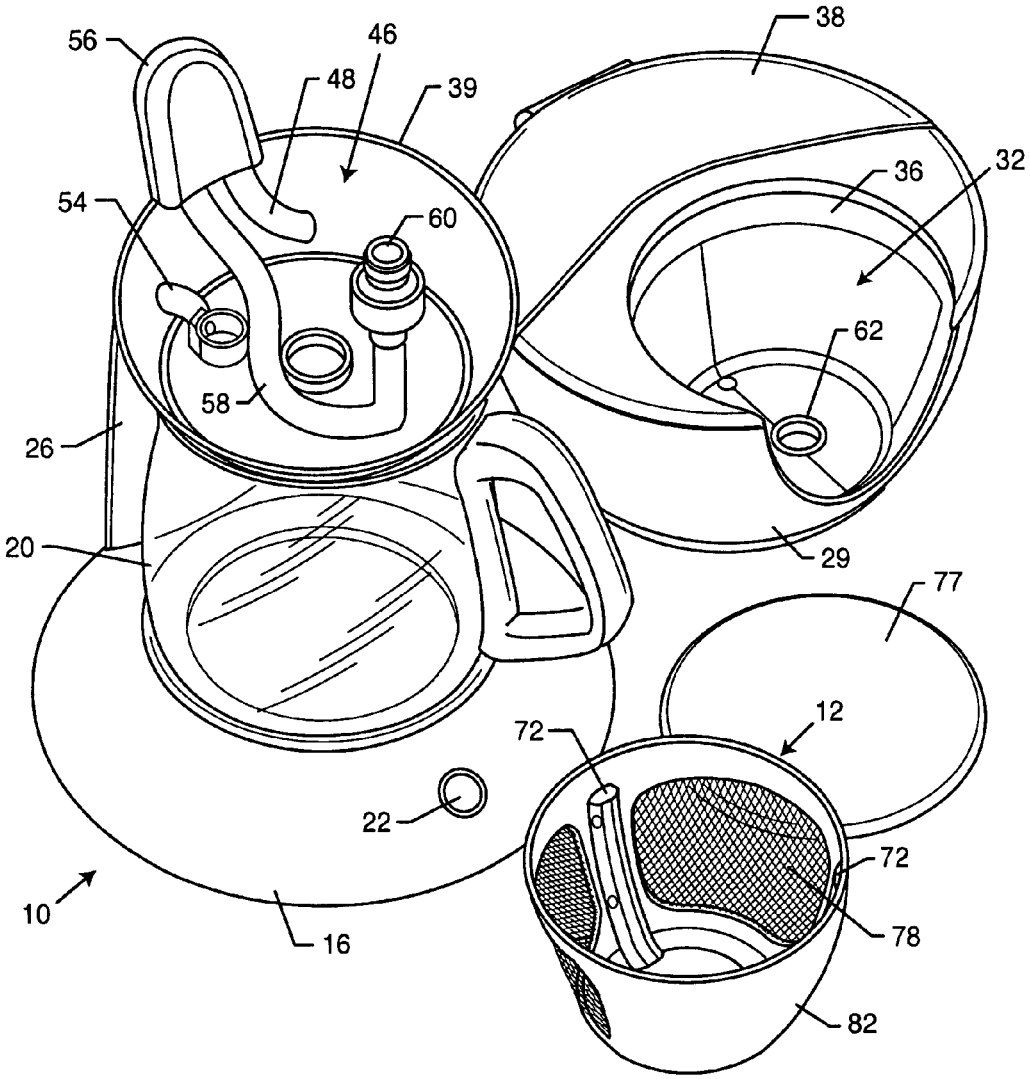
FIG. 5 is another top perspective view similar to FIG. 4, but showing further removal of an upper housing member of the brewer head, to exposed underlying water flow conduits.

As shown in the exemplary drawings, an improved coffee brewer referred to generally in FIGS. 1-6 by the reference numeral 10 is provided for rapid and consistent high quality brewing of coffee. The coffee brewer 10 includes a brew basket 12 (FIGS. 4-10) for receiving a selected quantity of ground coffee (not shown). In accordance with a primary aspect of the invention, the brew basket 12 is adapted for connection to a source of heated water, and includes at least one and preferably a plurality of jet ports 14 (FIGS. 7 and 9-11) positioned for agitating and turbulently stirring the coffee grounds to produce a substantially fluidized bed of suspended and water-borne coffee grounds within the brew basket 12. This fluidized bed results in substantially improved and intimately thorough wetting contact and intermixing between the hot water and the coffee grounds, for achieving enhanced flavor extraction to consistently produce a high quality, fuller-bodied and more robust coffee beverage.

The improved coffee brewer 10 of the present invention is shown generally in one preferred form in FIGS. 1-6. As depicted, the coffee brewer 10 comprises a relatively compact base 16 having a platen 18 formed or carried thereon with a size and shape suitable for secure rested support of a coffee pot 20 such as a carafe or decanter or the like. An on-off button 22 is exposed at a front side of the base 16 and may be depressed manually when brewing of a pot of coffee is desired, as will be described in more detail. A power cord 24 (FIG. 1) protrudes rearwardly from the base 16 for connecting the brewer 10 to a suitable electrical power source.

A support post 26 extends upwardly from a rear side of the base 16 to support an upper brewer head 28 in a positioned generally cantilevered over the upwardly open coffee pot 20 supported on the base platen 18. In general terms, the brewer head 28 comprises a relatively compact housing structure defining a water reservoir 30 (FIGS. 3-4) for receiving a selected volume of water for use in brewing a pot of coffee, in combination with an upwardly open cavity 32 (FIGS. 4-6) for removably supporting the brew basket 12. Upon depression of the on-off button 22, water within the reservoir 30 is delivered in heat exchange relation with a heating unit 34 shown mounted within the base 16 as viewed in FIG. 6, and further to the brewer basket jet ports 14 for delivery into the interior of the brew basket 12 in the form of a plurality of pressurized or jetted hot water streams. These hot water jets turbulently stir and intermix with coffee grounds contained within the brew basket 12 to produce the fluidized bed or suspension of coffee grounds within a spinning and swirling body of water within the brew basket, to produce the improved, high quality, and consistent coffee beverage in accordance with the invention. This coffee beverage is filtered and delivered from the brew basket to the underlying coffee pot or carafe 20, ready for immediate use and enjoyment.

More particularly, as shown in more detail in FIGS. 3-6, the illustrative brewer head 28 includes an upper housing bowl 29 with an internal, generally vertically oriented divider wall 36 subdividing the brewer head 28 into the upwardly open water reservoir 30 occupying a rearward region of the head 28, and the brewer basket cavity 32 at a forward region of the head 28. A rear hinged lid 38 is provided on the brewer head 28 for normally closing the water reservoir 30, but this lid 38 is adapted for quick and easy pivoting movement to an open position (as viewed in FIGS. 3-4) to permit a selected volume of water to be poured into the reservoir 30. In a typical residential coffee maker, the reservoir 30 may be sized for receiving a standardized volume of water, such as a water volume sufficient to brew a standardized volume of coffee, such as 8, 10 or 12 cups. Alternately, the brewer head 28 may include volumetric gradation marks (not shown) indicating the volume of water contained therein, to facilitate brewing of different selected volumes of coffee. As a further alternative, persons skilled in the art will recognize and appreciate that the coffee brewer 10 may be connected directly to a tap water source or the like, in lieu of the reservoir 30 for pour-in reception of a selected water volume.

The upper housing bowl 29 defining the water reservoir 30 is mounted on a lower housing shell 39 (shown best in FIGS. 5-6) which is supported at an upper end of the support post 26 in cantilevered relation spaced above the base 16. Water within the reservoir 30 is coupled through a port 40 formed in a bottom wall of the upper bowl 29 (FIG. 6) to an underlying receiver 44 which is mounted on the lower shell 39 within a compartment 46 defined cooperatively between the upper bowl 29 and lower shell 39. This receiver 44 may include a spring-loaded valve positioned for engagement by the upper bowl 29 for movement to an open position permitting downward water flow from the reservoir 30, when the upper bowl 29 is mounted on the lower shell 39. Such downward water flow proceeds through the receiver 44 and further through a short supply conduit 48 (FIGS. 5-6) which couples the water downflow to a passage 50 formed in the support post 26 and further to the heating unit 34. A first check valve 45 (FIG. 6) is mounted along this passage 50 within the support post 26 to permit water downflow, but to prevent upward backflow from the heating unit 34 toward the reservoir 30.

Figure 6:
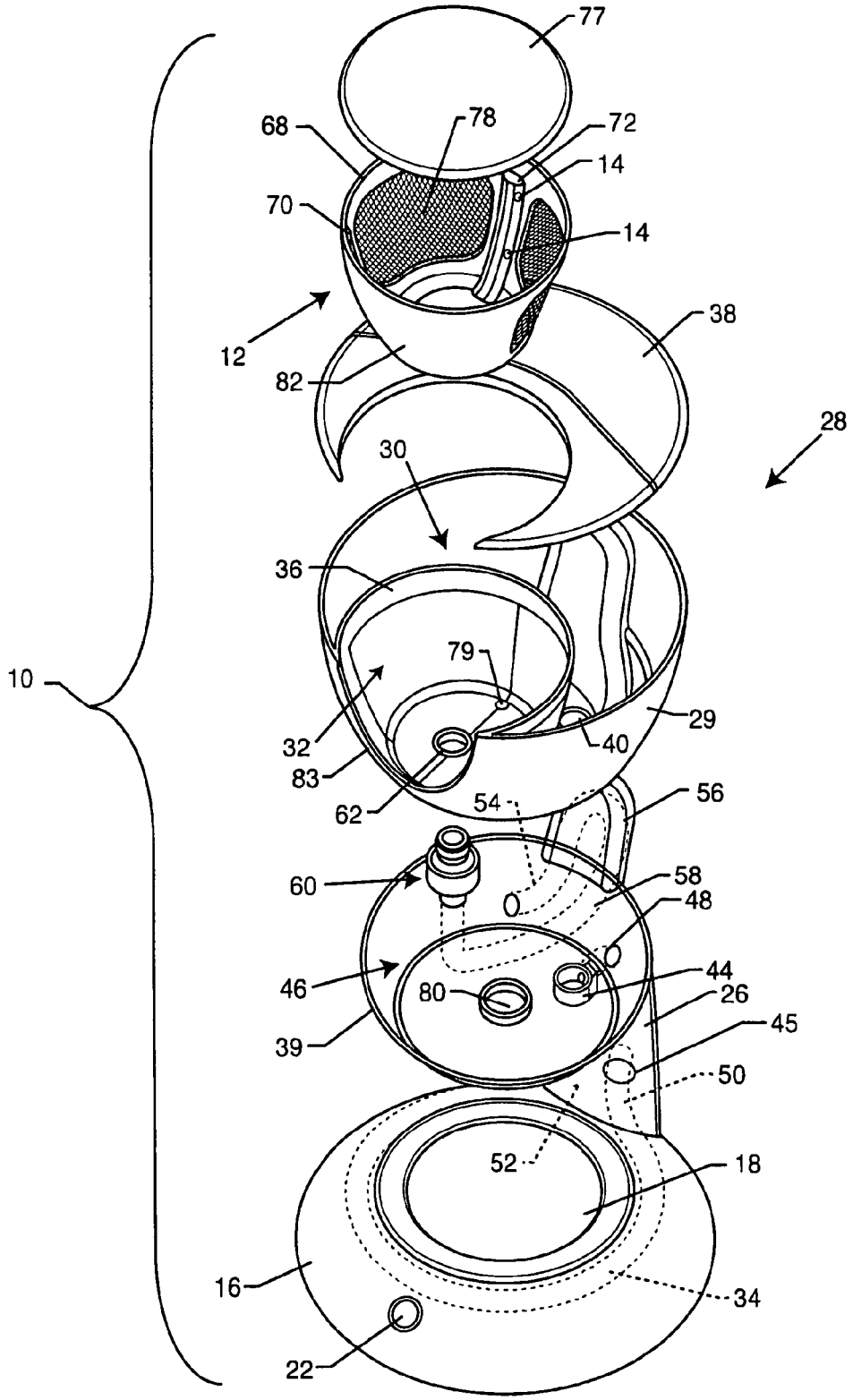
FIG. 6 is an exploded perspective view of the coffee brewer.
Figure 7:
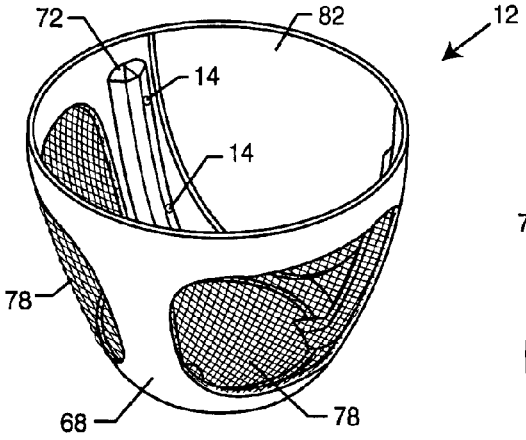
FIG. 7 is a top perspective view of the brew basket.
Figure 8:
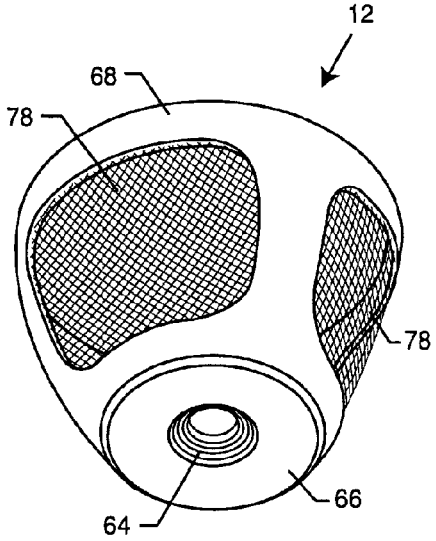
FIG. 8 is a bottom perspective view of the brew basket.
Figure 9:
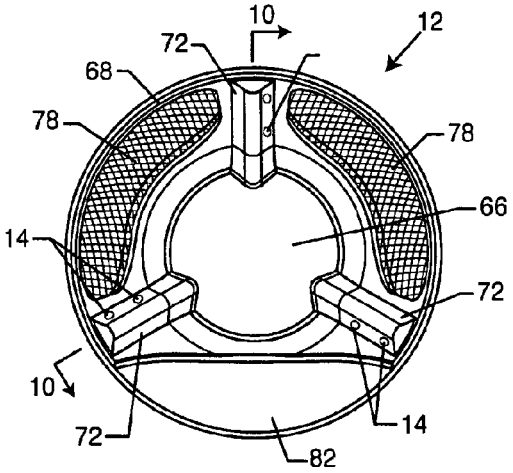
FIG. 9 is a top plan view of the brew basket.

The heating unit 34, although depicted generally in FIG. 6 by dotted lines, comprises a standard dual pathway device of the type known in the art for use in coffee brewers. In particular, the heating unit 34 incorporates an electrical resistance heating element mounted within one annular pathway and disposed in heat transfer relation with water flow through an adjacent annular pathway. One exemplary dual pathway heating unit of this general type is shown and described in U.S. Pat. No. 4,070,956, which is incorporated by reference herein. With this construction, the water downflow through the post passage 50 is circulated though the water pathway of the heating unit 34 which heats the water substantially to boiling. A downstream end of the water pathway through the heating unit 34 is coupled to a second flow passage 52 (FIG. 6) for upward or return flow to the brewer head 28.

The upward return flow passage 52 through the support post 26 delivers the heated water through a short transition conduit 54 to an inverted, generally U-shaped turn 56 positioned within the water reservoir 30 and disposed at least slightly above a maximum fill level of the reservoir. This inverted and elevated conduit turn 56 prevents water within the reservoir 30 from draining past the turn 56 when the reservoir is filled with water. A downstream end of the inverted conduit turn 56 is coupled by an additional supply conduit 58 to a second check valve 60 mounted at the underside of the upper bowl 29 to permit one-way flow-through passage of water from the supply conduit 58 to brew basket 12, but prevents backflow of water to the conduit 58.

More particularly, the second check valve 60 is positioned in aligned relation with an inflow port 62 (FIGS. 3 and 6) formed in the bottom wall of the upper housing bowl 29, at a location generally centered within the brew basket cavity 32. In this regard, as shown best in FIGS. 8 and 10, the brew basket 12 includes a downwardly open feed port 64 having a size and shape for seated reception on the underlying inflow port 62, when the brew basket 12 is positioned within the brew cavity 32. This feed port 64 communicates water inflow from the second check valve 60 to the jet ports 14 of the brew basket 12.

The brew basket 12 may comprise a generally bowl-shaped component constructed primarily from lightweight molded plastic or the like, to provide a generally upwardly open geometry defined by a bottom wall 66 joined to an upstanding side wall 68 of generally cylindrical configuration. The bottom wall 68 is formed to include the downwardly open feed port 64 for communicating hot water inflow upwardly into a false bottom or plenum chamber 70 (FIG. 10) which distributes the hot water flow to at least one and preferably a plurality of hollow ribs 72 formed in the side wall 68. In the preferred configuration as shown, three of said hollow ribs 72 are formed in the side wall 68 at approximate 120° intervals, and each of these ribs 72 includes a closed upper end and has at least one and preferably multiple jet ports 14 formed along the height thereof for jetting hot water streams into the interior of the brew basket 12. FIGS. 6-7 and 9-10 illustrate each hollow rib 72 with a pair of vertically spaced jet ports 14 positioned and aimed for jetting water streams generally tangentially in a common swirling direction (clockwise, as viewed in FIG. 9) into the brew basket interior.

Figure 10:
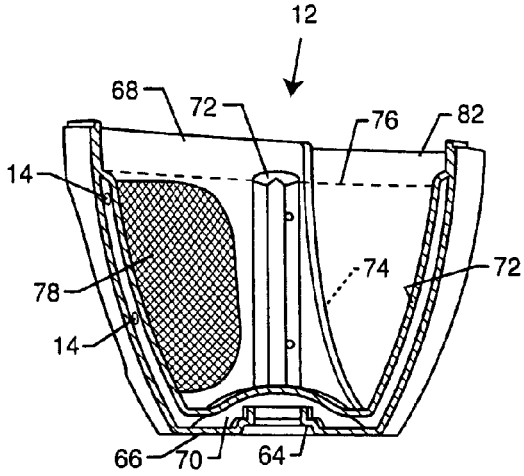
FIG. 10 is a vertical sectional view taken generally on the line 10-10 of FIG. 9.

At least the lower jet ports 14 on the hollow ribs 72 are positioned at a level below a normal level or upper surface of a bed of dry coffee grounds placed into the brew basket 12 for brewing coffee, as indicated approximately by the dotted line 74 in FIG. 10. Thus, when the hot water is jetted through the jet ports 14, at least a portion of the hot water stirs and agitates the body of coffee grounds to initiate a swirling or spinning action to create the fluidized bed of water-borne coffee grounds. That is, upon initial supply of hot water into the brew basket 12, water passing through the lower jets 14 stirs and agitates the initially dry coffee grounds, whereas the upper jets may be disposed above the upper surface of the coffee grounds and thereby initially spray onto and wet that upper surface. As hot water flow continues, the brew basket 12 gradually fills substantially with water, while the agitating and stirring action of the lower jets continues. As the brew basket fills with water, the water level eventually increases to a point higher than the upper jets 14, as indicated approximately by the dotted line 76 in FIG. 10, whereby the upper and lower jets 14 cooperatively stir and agitate the combined body of coffee grounds and water to suspend and swirl the coffee grounds in the form of a water-borne fluidized dispersion. Such action exposes the entire volume of the coffee grounds to the heated water thoroughly and substantially uniformly, and for substantially for the entire period of the brew cycle, to result in a significantly improved and consistently high quality brewed coffee beverage. A removable cap 77 is normally provided to close the top of the brew basket 12 and thereby prevent undesired spilling of water or coffee grounds therefrom during the brewing procedure.

Figure 11:
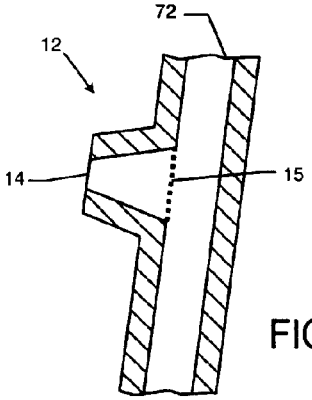
FIG. 11 is an enlarged fragmented sectional view showing a jet port in accordance with one preferred form of the invention, wherein heated water is jetted through the jet port into the brew basket.

In one preferred form as illustrated in FIG. 11, the jets ports 14 formed along the hollow ribs 72 of the brew basket 12 may be designed for minimizing or eliminating undesirable inflow or ingestion of particle-laden coffee when the supply of hot water to the jet ports 14 terminates. As shown in FIG. 11, each jet port 14 can be shaped to define a tapered profile with a cross sectional size that reduces toward a downstream or discharge end thereof, in combination with a filter screen 15 which can be formed as by in-place plastic molding generally at an upstream or inlet end of the jet port 14. Upon supply of hot water to the jet port, the water passes freely through the filter screen 15 and then outwardly through the jet port 14 at a substantial velocity for intermixing with the coffee grounds within the brew basket. Upon cessation of the hot water flow, any particulate grounds which may flow or be drawn into the jet port 14 are collected on the downstream side of the filter screen 15, where they cannot clog internal flow passages of the coffee maker apparatus. Instead, such collected grounds are retained on the screen 15 where they are hydraulically delivered back into the brew basket 12 during a subsequent brew cycle. Alternative structures for capturing ingested coffee grounds and/or for preventing backflow of such coffee grounds into and/or through the jet ports 14 will be apparent to persons skilled in the art.

The thus-produced fluidized bed is swirled by centrifugal action against the inboard side of the brew basket side wall 68, a portion of which is defined by one or more mesh or mesh-like filter elements 78. Such filter elements 78 are supported by the brew basket 12 in slightly spaced relation to the adjacent divider wall 36 to define a flow pathway for brewed coffee to pass therebetween to a drip outlet port 79 (FIG. 6) formed in the upper bowl 29 and an underlying drip outlet port 80 (FIGS. 5-6) formed in the lower shell 39. This latter outlet port 80 is positioned over the upwardly open coffee pot 20, whereby the brewed coffee flows downwardly for collection within the pot 20.

As viewed in FIGS. 1-6, the brew basket cavity 32 formed in the upper housing bowl 29 may intersect and thereby interrupt a forward region of the bowl 29, to form an arcuate recess 83 to expose a frontal portion or segment 82 of the brew basket 12 at a front side of the brewer head 28. In this regard, this exposed frontal segment 82 of the brew basket 12 is desirably formed from a transparent or partially transparent material to permit visual observation of the swirling and spinning fluidized bed during the brewing procedure. A lower margin of the recess 83 in the upper bowl 29 is disposed above the drip outlet port 79. The removable cap 77 may also be formed from a transparent or partially transparent material.

In use, to brew a pot of coffee, a selected volume of water is poured into the water reservoir 30, and the brew basket 12 containing a selected quantity of ground coffee is placed into the associated brew basket cavity 32 in the brewer head 28. A portion of the water within the reservoir 30 will flow downwardly through the first check valve 45 to fill the associated pathway within the heating unit 34. Then, upon depression of the on-off button 22, the heating unit 34 is energized to raise the temperature of the water therein substantially to boiling, resulting in pressure-forced pumping the hot water upwardly through the inverted and elevated inverted conduit turn 56 and further through the second check valve 60 to the jet ports 14 within the brew basket 12. This upwardly pumped water is replaced by continued water downflow from the reservoir 30, for heating by the heating unit 34, until the reservoir 30 reaches a substantially empty condition. The hot water is jetted into the interior of the brew basket 12 via the jet ports 14, as described, to generate the swirling turbulent fluidized bed of water-borne coffee grounds. The thus-brewed coffee is filtered through the mesh filter elements 78 for delivery into the underlying pot 20, wherein the brewed coffee may be retained in a heated state by suitably controlling the heating unit 34 for heating the platen 18. Alternately, the heating unit 34 may be designed to de-activate and the brewed coffee may be retained within an insulated decanter. Following this brew cycle, the brew basket 12 may be removed from the brewer head 28 for appropriate cleaning and discarding of the spent coffee grounds retained on the filter elements. Thereafter, the brew basket 12 may be refilled with coffee grounds for a subsequent brew cycle.

The improved coffee brewer 10 of the present invention thus produces brewed coffee by means of intimately thorough and consistent intermixing between the hot water and coffee grounds, to produce a coffee beverage of repeatable high quality taste and other characteristics. In addition, because the heated water passes directly into the coffee grounds, the resultant steam rising from the fluidized bed is believed to carry enhanced or intensified coffee aroma, thereby producing an enhanced of more enjoyable coffee brewing experience.

A variety of further modifications and improvements in and to the coffee brewer 10 of the present invention will be apparent to those persons skilled in the art. Accordingly, no limitation on the invention is intended by way of the foregoing description and accompanying drawings, except as set forth in the appended claims.

What is claimed is:

1. A coffee brewer, comprising:

a brew basket for receiving a quantity of ground coffee;

a plurality of jet ports for introducing a plurality of hot water streams into said brew basket, at least one of said jet ports being positioned to deliver a hot water stream into the brew basket at a location beneath the level of ground coffee contained therein, whereby the hot water streams introduced into said brew basket agitate and stir the coffee grounds to produce brewed coffee; and at least one filter element for passage of the brewed coffee substantially without passage of the coffee grounds;

said brew basket defining a plenum chamber in flow communication with said jet ports, and an open feed port for receiving a supply of hot water into said plenum chamber;

said brew basket having an upwardly open configuration defining a bottom wall and an upstanding side wall, said bottom wall defining said open feed port for receiving a supply of hot water into said plenum chamber, said side wall defining a plurality of hollow upstanding ribs in flow communication with said plenum chamber and each further defining at least one of said jet ports positioned to deliver a hot water stream into the brew basket at a location beneath the level of ground coffee contained therein.

2. The coffee brewer of claim 1 wherein said at least one filter element defines a wall portion of said brew basket.

3. The coffee brewer of claim 1 further including means for directing the brewed coffee from said at least one filter element for flow into a coffee pot.

4. The coffee brewer of claim 1 wherein said brew basket further includes a substantially transparent window to permit visual observation of the water-agitated coffee grounds contained therein.

5. The coffee brewer of claim 1 wherein said jet ports are positioned and aimed for jetting water streams generally tangentially into said brew basket in a common swirling direction.

6. The coffee brewer of claim 1 wherein each of said hollow ribs defines a plurality of said jet ports, at least one of which is positioned to deliver a hot water stream into the brew basket at a location beneath the level of ground coffee contained therein.

7. The coffee brewer of claim 1 further including a brewer head defining an upwardly open brew cavity for removably receiving and supporting said brew basket, said brewer head further including a drip outlet port for guided drip flow passage of brewed coffee passing through said at least one filter element into a coffee pot.

8. The coffee brewer of claim 7 wherein said brewer head further includes a hot water inflow port for seated engagement with said brew basket feed port, when said brew basket is positioned within said brew cavity.

9. A coffee brewer, comprising:

a brew basket for receiving a quantity of ground coffee:

a plurality of jet ports for introducing a plurality of hot water streams into said brew basket, at least one of said jet ports being positioned to deliver a hot water stream into the brew basket at a location beneath the level of ground coffee contained therein, whereby the hot water streams introduced into said brew basket agitate and stir the coffee grounds to produce brewed coffee;

at least one filter element for passage of the brewed coffee substantially without passage of the coffee grounds;

said brew basket defining a plenum chamber in flow communication with said jet ports, and an open feed port for receiving a supply of hot water into said plenum chamber;

a brewer head defining an upwardly open brew cavity for removably receiving and supporting said brew basket, said brewer head further including a drip outlet port for guided drip flow passage of brewed coffee passing through said at least one filter element into a coffee pot; and further including a base platen for removably supporting a coffee pot in position for drip flow reception of brewed coffee passing through said drip outlet port.

10. The coffee brewer of claim 9 further including a support post for supporting said brewer head in spaced relation above said base platen.

11. The coffee brewer of claim 9 wherein said base platen further includes a heating element.

12. A coffee brewer, comprising:

a brew basket for receiving a quantity of ground coffee;

a plurality of jet ports for introducing a plurality of hot water streams into said brew basket, at least one of said jet ports being positioned to deliver a hot water stream into the brew basket at a location beneath the level of ground coffee contained therein, whereby the hot water streams introduced into said brew basket agitate and stir the coffee grounds to produce brewed coffee;

at least one filter element for passage of the brewed coffee substantially without passage of the coffee grounds;

said brew basket defining a plenum chamber in flow communication with said jet ports, and an open feed port for receiving a supply of hot water into said plenum chamber; and further including a reservoir for receiving a supply of water, a heating element, a first check valve for permitting unidirectional flow of water from said reservoir into heat exchange relation with said heating element to produce hot water, and a second check valve for permitting unidirectional flow of said hot water to said at least one jet port.

13. A coffee brewer, comprising:

a brew basket for receiving a quantity of ground coffee;

a plurality of hollow, generally upstanding ribs positioned within said brew basket, each of said ribs being coupled to a supply of hot water, and each of said ribs including at least one jet port for introducing a plurality of hot water streams into said brew basket, at least one of said jet ports on at least one of said ribs being positioned to deliver a hot water stream into the brew basket at a location beneath the level of ground coffee contained therein to agitate and stir the coffee grounds to produce brewed coffee; and at least one filter element carried by said brew basket for passage of the brewed coffee substantially without passage of the coffee grounds.

14. The coffee brewer of claim 13 further including a brewer head defining an upwardly open brew cavity for removably receiving and supporting said brew basket.

15. The coffee brewer of claim 14 wherein said brewer head further defines a hot water inflow port for seated engagement with said brew basket and in flow communication with each of said hollow ribs, when said brew basket is positioned within said brew cavity.

16. The coffee brewer of claim 14 wherein said hollow ribs are positioned within said brew basket when said brew basket is positioned within said brew cavity.

17. The coffee brewer of claim 14 wherein said hollow ribs are formed integrally with said brew basket.

18. The coffee brewer of claim 13 wherein each of said hollow ribs includes at least one jet port positioned to deliver a hot water stream into the brew basket at a location beneath the level of ground coffee contained therein.

19. The coffee brewer of claim 13 wherein said jet ports are positioned and aimed for jetting water streams generally tangentially into said brew basket in a common swirling direction.

* * * * *